J. B. HALL.
METHOD OF TREATING COTTON BOLLS.
APPLICATION FILED JULY 22, 1913. RENEWED JUNE 26, 1915.
1,166,127.
Patented Dec. 28, 1915.
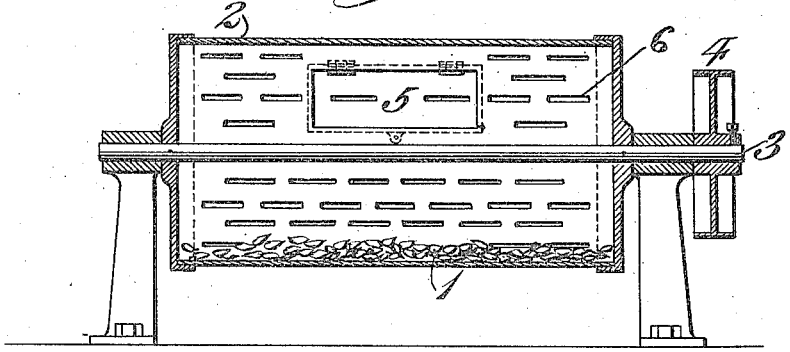
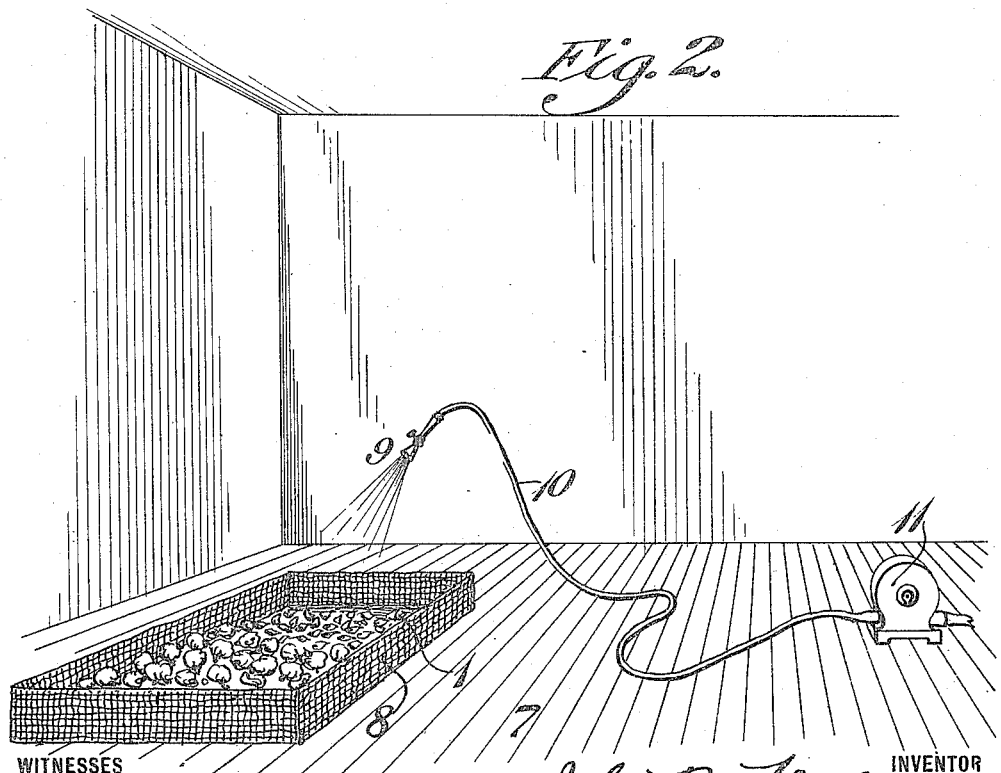

UNITED STATES PATENT OFFICE.

JOHN B. HALL, OF PHILADELPHIA, PENNSYLVANIA.

METHOD OF TREATING COTTON-BOLLS.

1,166,127.  Specification of Letters Patent.  Patented Dec. 28, 1915.

Application filed July 22, 1913, Serial No. 780,514. Renewed June 26, 1915. Serial No. 36,551.

*To all whom it may concern:*

Be it known that I, JOHN B. HALL, a citizen of the United States, residing in the city and county of Philadelphia, State of Pennsylvania, have invented a new and useful Method of Treating Cotton-Bolls, of which the following is a specification.

This invention relates to a method for artificially maturing immature cotton bolls or bolls which are gathered from the stalks of the cotton plants in a green state and have not actually reached maturity or opened in a natural way.

It has heretofore generally been the custom for the planter to allow the majority or as many as possible of the cotton bolls to reach maturity and to hang on the stalks until a majority of the same are opened and then to pick the same by hand. In this way, the unopened bolls which are on the stalks at the time of the first picking are left on the stalks and are generally allowed to go to waste or fall on the ground and thus afford a place of lodgment for the boll weevil. I am, however, enabled by my present invention to utilize all of these bolls heretofore gone to waste, since I pick all of them just at or before reaching maturity, and through the medium of my invention I then treat the same when green and closed in such a manner as to contract the exterior of the bolls. This causes the shells of the boll to artificially open outwardly and radially as in nature and cause the expansion artificially of the cotton fibers into a condition approximating or even better than the condition attained when the cotton matures naturally, the green bolls, if desired, being cleaned mechanically or by hand before being subjected to the final step of my novel process. It will thus be apparent that those bolls, which have heretofore been a waste product, and are as a total, an enormous loss to the county and to the planter can be converted into a commercial product, and the cotton obtained therefrom as compared to the natural product is not only equally as good as that matured naturally, but in many cases is far superior, by reason of the retention of the cellulose therein, when matured by my process.

The carrying out of my method has another highly desirable feature, in that the destructive pest, known as the cotton boll weevil, is ousted out of its habitation, namely, the maturing cotton boll, and the result consequently follows that probably, in a short time following the general use of my invention, this cotton boll weevil should be almost wholly exterminated. Furthermore, by the employment of my method, the North, East, and West, in addition to the South, can now economically and safely raise cotton because by my invention, the planter is enabled to mature cotton from the immature or green boll artificially when picked just at or prior to reaching maturity, so that the disadvantages of a cold climate or a short season are entirely obviated. Further, it will be seen that by the employment of my method, numerous abandoned farms in the North, East and West can now be utilized for cotton cultivation, and given over to this product, which statistics show is much more valuable and profitable than wheat, corn, or rye, which have been estimated to cost from seven to thirty times the amount of fertilizer and other expenses as compared with cotton cultivation.

By my present invention, the green or immature cotton bolls can be stripped from the stalks in the field, or, if desired, the cotton plants can be cut down with a scythe or any sharp instrument, and thereafter all the green or other bolls can be mechanically or by hand stripped from their stalks, while in a green or immature condition, thus saving the present expensive and slow process of picking out only the ripe bolls. I am thus enabled to use any and all bolls, and therefore all the bolls matured or immature on a cotton stalk can be quickly and expeditiously gathered at the same time, and the green or immature bolls subsequently and expeditiously treated by my novel invention.

In carrying out the steps of my novel invention, I am of course aware that various mechanisms may be devised or employed by which the foregoing results may be produced, and I therefore desire it to be understood that I do not wish to be limited to any particular apparatus or mechanism for performing the steps of my invention, as this is a pioneer invention in the art to which it appertains, and I am entitled to the broadest possible interpretation of the specification and claims hereof.

Figure 1 represents a sectional view of a tumbling or cleaning apparatus, wherein one step of my invention may be carried out.

Fig. 2 represents a perspective view of one manner of performing the subsequent steps of my process.

In the practice of my novel method the cotton bolls are first gathered, either in the green state or immature condition, or in the frost bitten stage, which may be done in any desired manner by severing the bolls from the stalks with a suitable sharp implement, such as a knife, or the stalks may be cut down with a scythe or the like, and the green or immature bolls mechanically or manually stripped therefrom. The green or immature bolls are next collected, for the remaining step or steps of my method, which so changes and transforms them from their green or immature state, that the cotton contained therein is artificially liberated for use.

Prior to undergoing the final steps of my invention, the bolls, if desired, may after having been picked in their green or unmatured condition be passed through an auxiliary step to clean the exterior of the green boll of sand, dirt, or like foreign material, whereby the bolls are rendered prior to the maturing step free of deleterious substances which might dirty or injure the cotton artificially produced. The cleaning step here referred to consists in the preferred embodiment of my invention of placing the gathered green or immature bolls 1, in a receptacle or tumbler 2, which is mounted on the shaft 3 which may be revolved by power applied to the pulley 4, the tumbler being provided with a door 5 for the insertion of the green bolls, and its interior having the projections 6, for effecting the cleaning of the exterior of the green bolls while in a green or immature condition. The green or immature bolls contained in the tumbler 2 are therefore cleaned upon the rotation of the tumbler, so that all dirt or substances of a foreign nature carried by or adhering to them are thrown off and collect in the bottom of said tumbler.

In carrying out the maturing step of my novel method, the cotton bolls are preferably spread upon the floor 7, or in a suitable tray 8, or the like and have applied thereto a maturing chemical composition, which is used in a wet or dry state, and comprises commingled talcum and starch either with or without a suitable granular detritus with a texture coarser than clay and finer than gravel, said parts being commingled in substantially the following proportions, one-quarter talcum, one-half starch, and one-quarter granular detritus with a texture coarser than clay and finer than gravel. If desired, the granular detritus may be omitted from the composition and the talcum and starch only, or similar materials employed, their proportions being slightly increased or diminished according to requirements, or according to atmospheric or climatic conditions. The maturing chemical composition may be employed wet or dry and injected on the green or immature bolls 1 through the nozzle 9 of the base 10, which is connected to the blower 11, which may be of the usual construction.

I have found by applying the above maturing composition or its equivalent to the cotton boll, either with or without the subsequent application of heat or a moisture extracting appliance that within a short space of time the outer fibers of the shell of the boll are artificially contracted which permits the expansion of the fibers of the cotton artificially and causes the latter to burst forth or be liberated in the same manner that occurs when cotton matures naturally. The cotton can then be readily removed from the boll in the usual way, and prepared for subsequent treatment in a cotton gin or other mechanism.

I have found by experiment that the fibers of cotton artificially matured from the green or slightly immature boll as above described are very much stronger and of a better quality than the fibers of cotton matured naturally, for the reason that in the case of cotton matured artificially by my process, the cellulose is retained in the fiber, thereby enhancing the value or quality of the cotton, whereas in the case of cotton which matures on the stalk, the same is ordinarily alternately exposed for a few days' time to rains or dew at night, and the heat of the sun, becoming alternately wet and dried, which tends to destroy the cellulose of the fiber which is retained in the latter by my method, the effect of which is evident.

It will be apparent that while I have shown in Fig. 1, one form of a cleaning apparatus which I may employ, I do not desire to be restricted to the use of the same, as the green or immature bolls may be cleaned manually as well as mechanically, or by any other suitable means, while the step of cleaning the exterior of the green or immature boll may be dispensed with entirely if desired or unnecessary. I desire, however, to lay especial emphasis upon the step of harvesting or severing the cotton boll from its stalk just at or before it reaches maturity, and then subjecting the same to the subsequent novel steps of my process. I have found by practical experience that the cotton bolls can be cut from their stalks two to three weeks before reaching maturity and perfect cotton artificially obtained therefrom by my process, which is even superior to cotton matured naturally by reason of the retention of the cellulose in the fibers of the cotton artificially matured as above explained. It will, of course, be evident that my invention may be applied with equal facility to cotton bolls which are near maturity or have even begun to slightly open naturally, but the great utility of my invention arises from the fact that I can harvest a crop of cotton several weeks in advance of its reaching maturity, and can furthermore obtain a better grade of cotton than is the case where the same is allowed to mature naturally.

So far as I am aware, I am the first in the art to employ any process or apparatus for the purpose above described, and my claims herein are to be interpreted with corresponding scope.

I desire to further call attention to the fact that the immature bolls which are picked from the stalks by the picker manually or mechanically can be removed twice or three times faster than when it is undertaken to mature the cotton as now picked on the boll from the open bolls since the picker must draw his hand back and forth with the matured cotton in it, look around and over the plant to see which bolls are ripe and consequently a considerable quantity of the loose cotton is lost from the picker's hands as it drops or blows away from him while reaching around to put it in his sack.

By my improved invention the green bolls can be all removed from the plants in a rapid and expeditious manner, and there is consequently a great saving in waste to the southern planter, by this method of picking, which will make a saving of a very large sum of money yearly to the planter as well as enabling the hundreds of cotton pickers to engage in other profitable employment.

By my invention there are no immature or frost bitten cotton bolls such as are now going to waste, and there is a great saving of the cotton now blown off by the wind after reaching maturity. Furthermore, my method obviates the loss of cotton irrecoverable owing to the scarcity of labor, one workman by my process being able to do the work of many, as the picking of all of the green bolls from the plant is infinitely quicker than picking out the matured cotton on the stalks.

By the employment of my novel method a greater number of cotton plants could be planted to a row, and more rows to the acre, as the amount of sun required by this process would be much less than is now the case to mature the bolls, the space between the plants would be less, and the plants can be placed closer together. The bolls thus grown practically in the shade would grow larger before reaching maturity, the staple will be longer, and the seed heavier, and it will be apparent that this new seed will go farther toward producing other and better varieties. With the planting of this improved seed which would undoubtedly follow with the improved cotton matured by my process this increase in the yield of cotton per acre would automatically occur and will result in a large increase in revenue to the planter in the future without any additional effort or expense on his part.

It will be apparent that cotton matured by my novel process is far superior to the same grade of cotton naturally matured which now on the field, while waiting to be picked, is subjected to the dews or chill of the night followed by the heat of the sun the next day or possibly some days of rain or climatic conditions of some kind together with the dirt and dust blown on the cotton, all certainly deteriorating and weakening it from the standard it was when the boll first burst. In my quick maturing process under cover none of these weather conditions exist. The gloss on the artificially matured cotton produced by my process is of a brilliancy and whiteness free from all weather stains, and far superior to that possible on any cotton naturally matured and exposed to deteriorating weather conditions.

My process in addition to being cheaper, furthermore saves all cotton waste since all the bolls within three weeks or a month of maturity can be picked from the stalks, when the crop is threatened with danger either from the elements or from any pest whatever, thus giving insurance against weather and pests. Furthermore by picking some of the bolls three weeks or a month before maturity, the strength of the plant is increased and the remaining bolls grow larger from the increased substance than they would obtain from the plant.

The top crop, a great quantity of which now goes to waste, due to maturing late and an early fall and early frost checking not only the maturing of the bolls but killing them, is completely saved by my novel process. Furthermore, the boll weevil which is rapidly extending over the entire cotton district of the South and has already since its appearance caused an estimated loss of $125,-000,000 represented by 2,550,000 bales of cotton would be practically exterminated, and the stalks and pods can be fully utilized for valuable by-products which are as valuable as cotton itself instead of being replowed into the ground, forming nourishment for insects.

By the employment of my novel process one man can mature from six to ten bales of cotton a day according to the size of the apparatus employed, the time consumed for maturing cotton by my process ranging from only two to three hours.

It will be apparent from the foregoing that so far as the state of the art shows to the contrary, I am the first in the art to employ the novel method hereinabove described for artificially maturing any or all cotton bolls detached from their stalks before maturity and that my claims to the various steps of my process are to be interpreted with the corresponding scope awarded to a pioneer invention.

Having thus described my invention, what I claim as new and desire to secure by Letters Patent, is:—

1. The herein described process of maturing green or immature cotton bolls, which consists in severing the green or immature bolls from the stalks prior to their reaching maturity, next cleaning the exterior of said bolls and lastly gradually contracting the outer fibers of the shells of the bolls, whereby said bolls are artificially opened and the fibers of cotton expanded into the natural or matured condition.

2. The herein described process of maturing green or immature cotton bolls, which consists in harvesting the green or immature cotton bolls prior to their reaching maturity, artificially applying to said green or immature bolls, a moisture absorbing composition, contracting the fibres of the shell of said boll, and lastly expanding the fibers of the cotton contained therein into a matured state.

3. The herein described process of maturing green or immature cotton bolls, which consists in harvesting the green or immature cotton bolls, prior to their reaching maturity, and next applying to said bolls a maturing moisture absorbing composition adapted to adhere to said bolls and cause the same to artificially mature and open.

4. The herein described process of maturing green or immature cotton bolls, which consists in harvesting the green or immature cotton bolls, prior to their reaching maturity, next applying a chemical agent to the surface of the bolls to gradually curl open the exterior of the bolls and simultaneously expand the cotton fibers to induce the matured state of said fibers.

5. A process of treating cotton bolls, consisting in detaching the bolls from their stalks before the bolls reach maturity and artificially maturing the bolls.

6. A process of treating cotton bolls, consisting in detaching all of the bolls from their stalks before the bolls are matured, cleaning the bolls, and artificially maturing the bolls.

7. A process of treating cotton bolls, consisting in harvesting the cotton plants, before the bolls are matured, detaching the bolls from their stalks, and artificially maturing the bolls.

8. A process of treating cotton bolls, consisting in removing the bolls from their stalks, before the bolls are matured, artificially maturing the bolls and removing the matured cotton from the opened bolls.

9. A process of treating cotton bolls, consisting in harvesting the cotton bolls while they are immature, cleaning the bolls free from dirt and extraneous plant parts, and artificially maturing the bolls.

JOHN B. HALL.

Witnesses:
 E. HAYWARD FAIRBANKS,
 C. D. McVAY.

Copies of this patent may be obtained for five cents each, by addressing the "Commissioner of Patents, Washington, D. C."